C. G. STRANDLUND.
PLOW.
APPLICATION FILED FEB. 2, 1914.

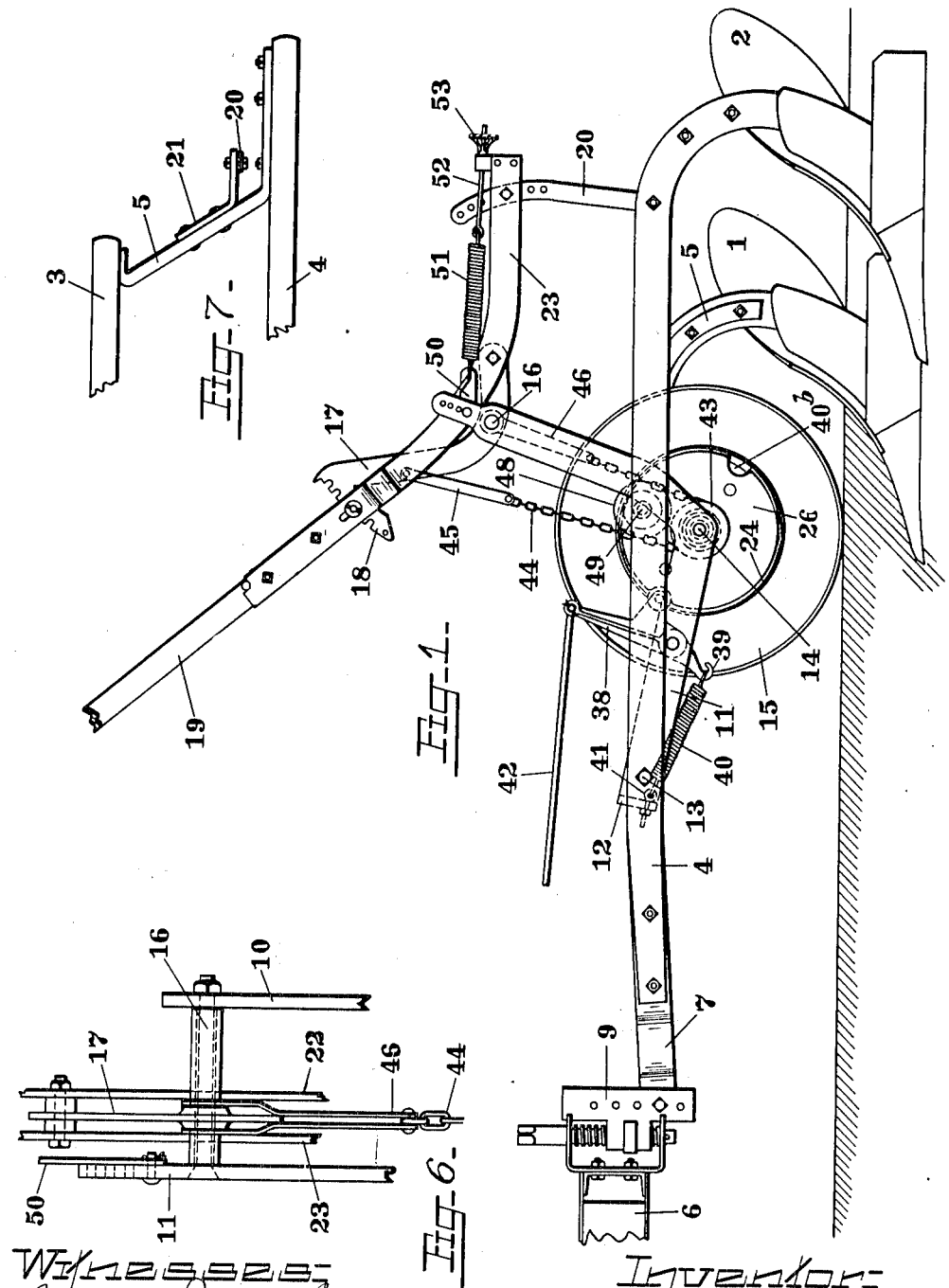

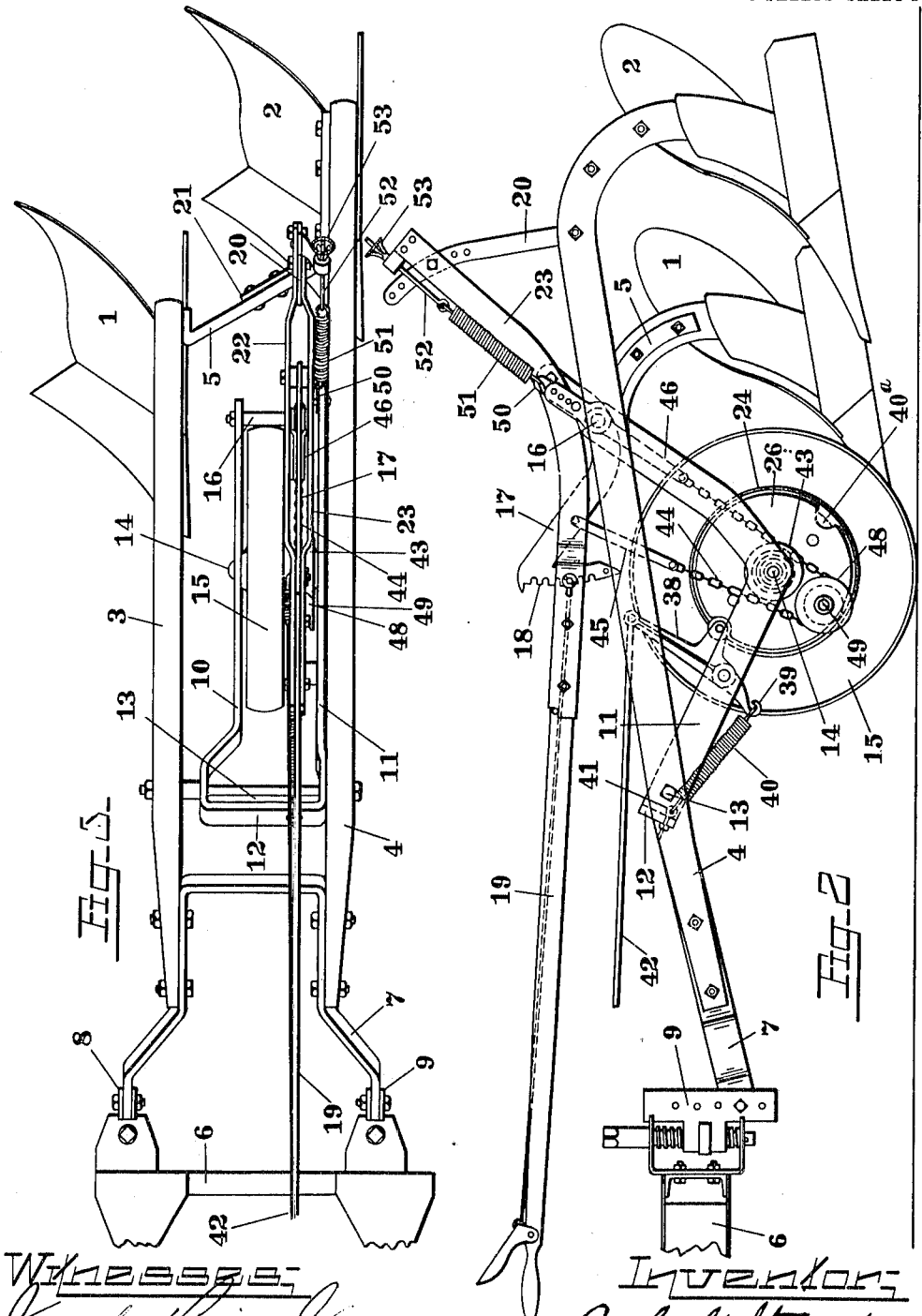

1,119,998.

Patented Dec. 8, 1914.
3 SHEETS—SHEET 3.

Witnesses:
Joseph Main Jr.
Bertha A. Maurer.

Inventor:
Carl G. Strandlund
by W.C. Indiuston
Attorney

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

PLOW.

1,119,998.  Specification of Letters Patent.  Patented Dec. 8, 1914.

Application filed February 2, 1914. Serial No. 816,060.

*To all whom it may concern:*

Be it known that I, CARL G. STRANDLUND, a citizen of the United States, residing at Moline, in the county of Rock Island and State of Illinois, have invented certain new and useful Improvements in Plows, of which the following is a specification, reference being had therein to the accompanying drawing.

My invention relates to gang-plows, and particularly to that class in which any one of the plows may be raised by hand, or raised by suitable power actuated mechanism.

The object of my invention is to provide means for raising the plows from the ground by the operation of a wheel, as fully described hereinafter.

Figure 4:
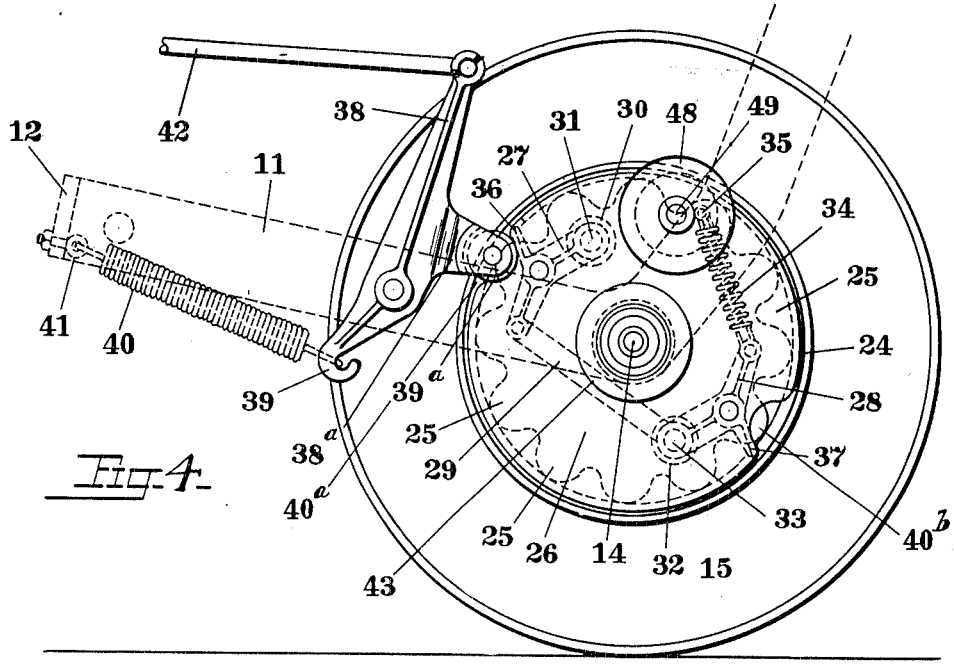
Figure 5:
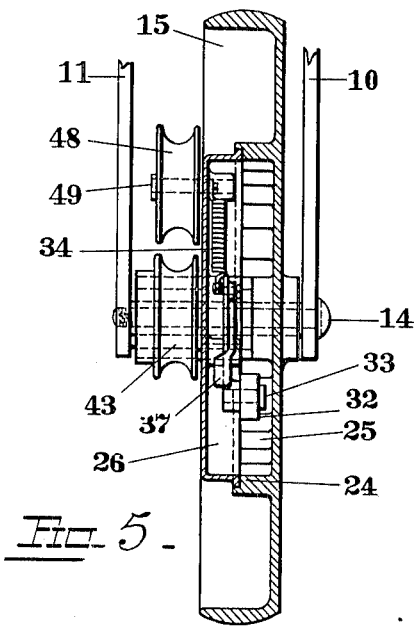

Referring to the drawings in which similar numerals indicate identical parts—Figure 1 is a side elevation with the plow in an operative position. Fig. 2 is a similar view with the plow raised from the ground. Fig. 3 is a plan of Fig. 1. Fig. 4 is an enlarged view of the wheel and related parts. Fig. 5 is a vertical section of Fig. 4. Figs. 6 and 7 are details.

The drawings illustrate one of the plow units of a gang-plow, all the units of which are operable alike.

The unit consists preferably of two bodies 1 and 2, each body comprising as usual a landside, moldboard and share secured to beams 3 and 4. The beams 3 and 4 are spaced apart and rigidly connected rearwardly by a brace 5 bolted to both beams. Each unit is independently secured to a frame 6, as in this instance by a yoke 7 rigidly bolted to the beams 3 and 4 and expanded laterally beyond the beams and forwardly to pivotal connection with adjustable clevises 8 and 9 on the frame 6, the lateral expansion of the yoke 7 presenting greater resistance to side thrust and adding to rigidity of the structure.

A member formed with substantially parallel side bars 10 and 11 terminates forwardly in a yoke 12 which is pivoted, between the beams 3 and 4, on a shaft 13 on which it is adapted to rock, the shaft being mounted on the beams 3 and 4. From the yoke 12 the bars 10 and 11 project downwardly in a rearward direction to a point substantially central of their lengths and then extend upwardly each forming an angle in the apex of which is mounted a shaft 14 having a wheel 15 journaled thereon.

Pivoted intermediate its ends on a shaft 16, mounted rearwardly on the bars 10 and 11, is a curved lever 17, its forward end provided with a toothed segment 18, and its rear end forming a fulcrum for a hand lever 19 which is pivoted thereon and extends rearwardly to engage with a link 20 pivoted on a bracket arm 21 secured on the brace 5. The lever 19 is provided with the usual dog latch to engage with the teeth of the toothed segment 18, and its rearward curved portion is formed preferably of two bars 22 and 23 spaced apart intermediate their ends, in which space the lever 17 is adapted to move.

The wheel 15 is provided with a central casing 24 having internal rolling teeth 25, the wheel, casing and teeth being preferably integral. Revolubly mounted on the shaft 14 and closing the opening of the casing 24 is a member or disk 26 on the inner face of which levers 27 and 28 are pivotally mounted intermediate their ends and connected by a link 29; the free end of lever 27 carries a roller 30 journaled on a pin 31 thereon, a similar roller 32 is journaled on a pin 33 on the end of the lever 28 to which an end of the link 29 is attached; a spring 34 is connected to the opposite end of the lever 28 and to a pin 35 on the disk 26. Projecting outwardly from the levers 27 and 28 are fingers 36 and 37; the casing 24 projects beyond the teeth 25 so that sufficient space is provided for the fingers 36 and 37 between the teeth 25 and the disk 26.

Mounted pivotally on the inner side of the side bar 11 is a rocking lever 38, its end below the pivot formed into a hook 39 engaging with a coiled spring 40 which is also connected with an eye bolt 41 on the yoke 12; preferably forming part of the lever 38 is a rearwardly extending arm 38ᵃ having a roller 39ᵃ pivotally mounted on the end thereof and adapted to engage notches 40ᵃ and 40ᵇ diametrically opposite each other in the periphery of the disk 26; to the upper end of the lever 38 is pivotally secured a rod 42 which extends forwardly to the mainframe of the gang plow and the use of which will be more fully explained hereinafter.

Preferably integral with the disk 24 is a pulley 43 around which passes a chain or cable 44, one end of which is attached to a link 45 pivotally connected to the curved lever 17 forward of the pivot of the latter on the side bar 11, the other end of the chain 44 is connected between the lower ends of a pair of depending arms 46 journaled on the shaft 16 and opposite sides of the curved lever 17. An idler pulley 48 is journaled on a pin 49 on the disk 24. A hook 50 is pivoted on the end of the side bar 11 and engages with one end of a coiled spring 51, the other end of which connects with a rod or bolt 52; the latter passes through a bracket arm on the rear ends of the bars 22 and 23, and is threaded to register with a hand screw 53 which bears against the bracket arm, so that by turning the hand screw 53 the tension of the coiled spring 51 may be increased or diminished as desired.

To lift the plow entirely out of operation by hand, I employ the lever 19; the latter being pivoted on the rear end of the curved lever 17 and engaging with the segment 18; in the operation of lifting the plow unit entirely from the ground it will be seen that both the levers 17 and 19 are locked together and move as one on the shaft 16, the rear end of the lever 19 being connected to the plow unit by a link 20, so that a downward movement of the forward end of the lever 19 will lift the plow unit clear of the ground, and when at a sufficient height therefrom the lever 19 may be held down by a hook or other means on the frame 6. To regulate the depth to which it is desired to plow, I release the latch on the lever 19 from the toothed segment 18 so that the lever 19 will be free to move on its pivot on the curved lever 17 to raise or lower the plow, and when the desired adjustment is secured, the dog is again engaged with the toothed segment holding the plow in its adjusted position. When however I desire to employ power from the implement itself to lift from the ground for any purpose, I operate the rod or cable 42; a pull on said rod 42 will actuate the rocking lever 38, to withdraw the roller 39ᵃ from the notch 40ᵃ and disengage it from the dog 36; the levers 27 and 28, on the disk 26, being connected by the link 29, will, by the tension of the spring 34, be actuated simultaneously to carry the rollers 30 and 32 into engagement with the rolling teeth 25 of the casing 24 which being attached to or integral with the wheel 15 revolves therewith. When the lever 38 is operated as described and the roller 39ᵃ is withdrawn from the notch 40ᵃ in the disk 26, the action of the levers 27 and 28 is instantaneous and the disk 26 and wheel 15 will revolve together, the roller 39ᵃ traveling on the periphery of the disk 26; the idler pulley 48 on the disk 26 will be carried around with the latter, and acting against the chain 44 will draw downward that portion of the chain connected to the link 45 on the curved lever 17 rocking the latter on the shaft 16, and as the lever 17 is locked to the hand lever by the latch thereon engaging with the toothed segment 18, and as the plowing unit is connected to the hand lever, the rocking movement of the two levers is as one and the plowing unit is lifted clear of the ground as shown in Fig. 2. This operation is accomplished during a half revolution of the wheel 15 and the disk 26; as this half revolution is completed the roller 39ᵃ enters the presented notch 40ᵇ, by reason of the tension of the spring 40 connected to the lever 38 and the yoke 12; the finger 37 now engages with the roller 39ᵃ, and the levers 27 and 28 are rocked removing the rollers 30 and 32 from the rolling teeth 25 in the casing 24, thus releasing the disk 26 from engagement with the wheel 15. It will be noticed that in lifting the plow the force employed is exerted at two different points, the pivot 16 of the lever 17, and the shaft 13 on which the yoke 12 is pivoted.

As shown in Fig. 2 the loose pulley 48 is practically on a dead center between the shaft 16 and the pivoted connection of the link 45 with the curved lever 17, consequently the stress of the weight of the plow unit is practically on the wheel 15, and the tension of the spring 40 being sufficient to hold the roller 39ᵃ in engagement with the notch 40ᵇ, the disk 26 is thus held inoperative and the plow retained in its raised position above the ground; it is obvious that if the lever 38, connected to this plow unit, be again operated, the disk 26 and wheel 15 will again be connected as described, and their forward movement will result in the plow unit being lowered for plowing.

The plowing unit as shown and described consists of two plows, but I do not limit myself to this construction, for my device is equally applicable, and equally effective if the plowing unit consists of one plow only, or of more than two plows connected to be raised or lowered together as will be readily understood.

In my construction the weight of the plow is carried almost entirely by the wheel 15 so that at all times sufficient traction power is available to lift the plow from any depth it may be operating, the lift being positive and direct and instantly responsive.

What I claim is—

1. In a plowing mechanism, the combination of a support, a plow unit connected thereto and adapted to move vertically, a bail pivotally connected to said unit, a wheel journaled on said bail and revoluble when in contact with the ground, plow lifting devices between said wheel and plow unit, means to optionally connect said wheel and lifting devices to raise said plow unit by the traction power of said wheel, and manually operable means to raise said plow unit independent of the wheel power.

2. In a plowing mechanism, the combination of a support, a plow unit connected thereto and adapted to move vertically, a bail pivoted on said unit, a wheel journaled on said bail and revoluble when in contact with the ground, plow lifting devices between said wheel and plow unit, means to optionally connect said wheel and lifting devices to raise said plow unit by the revolution of said wheel, and manually operated means to raise said plow unit independent of the wheel power.

3. In a plowing mechanism, the combination of a support, a plow unit connected thereto and adapted to move vertically, a bail pivotally connected to said unit and carrying a continuously revolving wheel, plow lifting devices between said wheel and plow unit, means to optionally connect said wheel and lifting devices to raise said plow unit by the traction power of said wheel, and manually operable means connected to said lifting devices to raise said plow unit independent of the wheel power.

4. In a plowing mechanism, the combination of a support, a plow unit connected thereto and adapted to move vertically, a bail pivotally connected to said unit and carrying a continuously revolving wheel, manually operable means to raise said plow unit, and means connecting said wheel and manually operable means to actuate the latter to raise said plow unit by the traction power of said wheel.

5. In a plowing mechanism, the combination of a support, a plow unit connected thereto and adapted to move vertically, a bail pivotally connected to said unit and carrying a continuously revolving wheel, means manually operable to raise said plow unit, and means connecting said wheel and manually operable means to actuate the latter toward said bail to raise said plow unit by the traction power of the wheel.

6. In a plowing mechanism, the combination of a support, a plow unit connected thereto and adapted to move vertically, a bail pivotally connected to said unit and extending rearwardly, means pivotally mounted rearwardly on said bail and manually operable to raise said plow unit, a continuously revolving wheel journaled on said bail between the connection thereof with the support and the manually operable means, devices connecting the latter with said wheel and adapted to be actuated by the traction power of said wheel to raise said plow unit, said manually operable means approaching said bail as the plow unit is raised and receding therefrom when the latter is lowered.

7. In a plowing mechanism, the combination of a support, a plow unit connected thereto and adapted to move vertically, a bail pivotally connected to said unit and carrying a continuously revolving wheel, a manually operable lever mounted on said bail and connected to said plow unit, and means intermediate said wheel and lever, and connected therewith to actuate said lever to raise the plow unit by the traction power of said wheel, said lever rocking toward the bail as the plow unit is raised and receding therefrom as the plow unit is lowered.

8. In a plowing mechanism, the combination of a support, a plow unit connected to said support and movable vertically, a bail pivotally connected to said unit and having a continuously revolving wheel mounted thereon, a lever pivoted rearwardly on said bail, a manually operable lever pivoted on the first lever and normally rigid therewith and connected to said plow unit, and means connecting said wheel and first lever to actuate both levers to raise the plow unit by the traction power of said wheel.

9. In a plowing mechanism, the combination of a support, a plow unit pivotally connected to said support for vertical movement, a bail pivotally connected with said unit and carrying a continuously revolving wheel, a lever pivoted rearwardly on said bail, a manually operable lever pivotally mounted on the first lever and normally rigid therewith and connected rearwardly to said plow unit to raise the latter at will, and means between said wheel and levers to actuate the latter to raise the plow unit by the traction power of said wheel.

10. In a plowing mechanism, the combination of a support, a plow unit pivotally connected thereto and adapted to move vertically, a bail pivotally connected to said unit, a fixed shaft on said bail having a continuously revolving wheel journaled thereon, manually operable lifting devices mounted on said bail and connected to the plow unit to raise the latter at will, means intermediate said wheel and lifting devices to actuate the latter by the traction power of said wheel, and means on said shaft to connect said wheel and lifting devices.

11. In a plowing mechanism, the combination of a support, a plow unit pivotally connected thereto and adapted to be moved vertically, a bail pivotally connected to said unit, a fixed shaft on said bail having a continuously revolving wheel thereon, manually operable lifting devices pivotally mounted on said bail and connected to the plow unit to raise the latter at will, normally inactive power actuable means intermediate said wheel and lifting devices, and connected to the latter, and means on said shaft and optionally operable to connect said wheel to the normally inactive power actuable means to operate the lifting devices thereby to raise said plow unit by the traction power of said wheel.

12. In a plowing mechanism, the combination of a support, a plow unit pivotally connected thereto and adapted to be moved vertically, a bail pivotally connected to said unit, a fixed shaft on said bail having a continuously revolving wheel thereon, a lever pivoted on said bail, a second lever pivoted on the first lever and connected to said plow unit and normally rigid with the first lever and optionally manually operable to lift said plow unit, a revoluble member on said shaft having a pulley connected therewith, flexible means passing around said pulley and connected to said bail and first lever, and means to connect said wheel and revoluble member to actuate said levers to raise the plow unit by the traction power of said wheel.

13. In a plowing mechanism, the combination of a support, a plow unit pivotally connected thereto and adapted to be moved vertically, a bail pivotally connected to said unit and having a fixed shaft mounted thereon, a continuously revolving wheel journaled on said shaft, lifting devices mounted on said bail and connected to said plow unit, a revoluble member mounted on said shaft and connected with said lifting devices, and means operative at will to engage said member with the wheel to actuate said lifting devices to raise the plow unit by the traction power of said wheel and by one-half revolution thereof.

14. In a plowing mechanism, the combination of a support, a plow unit pivotally connected thereto and adapted to be moved vertically, a bail pivotally connected to said unit, a fixed shaft on said bail having a continuously revolving wheel journaled thereon, and lifting devices connected to said unit and adapted to be connected with said wheel at will to raise said unit by the traction power of said wheel and with one-half revolution thereof.

15. In a plowing mechanism, the combination of a support, a plow unit pivotally connected thereto and adapted to be moved vertically, a bail pivotally connected to said unit, a fixed shaft on said bail having a continuously revolving wheel journaled thereon, lifting devices mounted on said bail and connected to said unit, a revoluble member mounted on said shaft and connected with said lifting devices, means to engage said member with the wheel for simultaneous revolution thereof, and means to disengage said member from said wheel at each half revolution.

16. In a plowing mechanism, the combination of a support, a plow unit pivotally connected thereto for vertical movement, a bail pivotally connected to said unit and carrying a fixed shaft, a continuously revolving wheel journaled on said shaft, lifting devices mounted on said bail and connected to said unit, a revoluble member mounted on said shaft and connected with the lifting devices, means to engage said member with the wheel for simultaneous revolution thereof, and means pivoted on the bail and adapted to disengage said wheel and member at each half revolution thereof.

17. In a plowing mechanism, the combination of a support, a plow unit pivotally connected thereto for vertical movement, a bail pivotally connected to said unit and carrying a fixed shaft, a continuously revolving wheel journaled on said shaft, lifting devices mounted on said bail and connected to said unit, a revoluble member mounted on said shaft and connected with the lifting devices, means to engage said member with the wheel for simultaneous revolution thereof, a lever pivoted on the bail, means on said lever adapted to engage with said member at each half revolution thereof to prevent further movement with the wheel.

18. In a plowing mechanism, the combination of a support, a plow unit pivotally connected thereto for vertical movement, a bail pivotally connected to said unit and carrying a fixed shaft, lifting devices pivoted on said bail and connected to said plow unit, a continuously revolving wheel on said shaft, a revoluble member mounted on said shaft and connected with said lifting devices, and means operative at will to engage said member with the wheel to actuate said lifting devices to raise the plow unit by the traction power of said wheel on one-half revolution of said member and to lower said plow unit by the next half revolution of said member.

19. In a plowing mechanism, the combination of a support, a plow unit pivotally connected thereto and adapted to move vertically, a bail pivotally connected to said unit, a fixed shaft on said bail having a continuously revolving wheel journaled thereon, said bail extending upwardly from said shaft, a lever pivotally supported on said bail, a manually operable lever pivoted on the first lever and projecting rearwardly from its pivot, means to adjustably connect both levers together for simultaneous movement, a connection from the rear end of the second lever to the plow unit, a revoluble member on the fixed shaft and connected with the first lever, and means to engage said member with the wheel to revolve simultaneously therewith to actuate said levers to lift the plow unit by the traction power of said wheel.

20. In a plowing mechanism, the combination of a support, a plow unit pivotally connected thereto for vertical movement, a bail pivotally connected to said unit and carrying a fixed shaft, lifting devices pivoted on said bail and connected to said plow unit, a continuously revolving wheel on said shaft, a revoluble member mounted on said shaft and connected with said lifting devices, means operative at will to engage said member with the wheel to actuate said lifting devices to raise the plow unit by the traction power of said wheel on one-half revolution of said member and to lower said plow unit by the next half revolution of said member, and means to lock said member against further movement after each half revolution thereof.

21. In a plowing mechanism, the combination of a support, a plow unit pivotally connected thereto for vertical movement, a bail pivotally connected to said unit and carrying a fixed shaft, lifting devices pivoted on said bail and connected to said plow unit, a continuously revolving wheel on said shaft, a revoluble member mounted on said shaft, a pulley affixed to said member, a chain connected to said lifting devices and passing around said pulley and connected with the rear end of said bail, means to engage said wheel and revoluble member to actuate the latter, and an idler pulley mounted on said member near the periphery thereof and adapted to engage with the chain as said member revolves to operate the lifting devices to raise the plow unit by the traction power of said wheel.

22. In a plowing mechanism, the combination of a support, a plow unit pivotally connected thereto for vertical movement, a rearwardly extending bail pivotally connected to said unit and bent upwardly intermediate its length, a shaft mounted on said bail at the bend thereof and carrying a continuously revolving wheel, a lever pivotally mounted on the rear end of said bail, a second lever pivotally mounted on the first lever and normally movable therewith and connected to the plow unit and manually operable to raise said unit, a revoluble member on said shaft, a pulley on said shaft and affixed to said member, a chain connected to the rear end of said bail and passing around the pulley on the member and connected to the first lever, an idler pulley mounted on said member, and means to engage said member with the wheel to impart motion thereto, said idler pulley being adapted to act against the chain as said member revolves to operate the levers to raise the plow unit by the traction power of said wheel.

In testimony whereof I affix my signature, in presence of two witnesses.

CARL G. STRANDLUND.

Witnesses:
CHARLES H. MELVIN,
W. G. DUFFIELD.